(12) United States Patent
Hong et al.

(10) Patent No.: US 12,030,524 B2
(45) Date of Patent: Jul. 9, 2024

(54) METHOD AND DEVICE FOR CONTROLLING AUTONOMOUS DRIVING

(71) Applicants: Hyundai Motor Company, Seoul (KR); Kia Corporation, Seoul (KR)

(72) Inventors: Jeong Ki Hong, Seongnam-si (KR); Kyung Joo Bang, Seoul (KR); Byeong Hyeok Min, Hwaseong-si (KR); Il Hwan Kim, Hwaseong-si (KR); Kyeong Eun Kim, Gunpo-si (KR); Dong Hyuk Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 209 days.

(21) Appl. No.: 17/508,403

(22) Filed: Oct. 22, 2021

(65) Prior Publication Data

US 2022/0144310 A1    May 12, 2022

(30) Foreign Application Priority Data

Nov. 10, 2020    (KR) .................. 10-2020-0149541

(51) Int. Cl.
| | |
|---|---|
| *B60W 40/08* | (2012.01) |
| *B60W 30/18* | (2012.01) |
| *B60W 50/16* | (2020.01) |
| *B60W 60/00* | (2020.01) |

(52) U.S. Cl.
CPC .. *B60W 60/0015* (2020.02); *B60W 30/18072* (2013.01); *B60W 40/08* (2013.01); *B60W 50/16* (2013.01)

(58) Field of Classification Search
CPC ..... B60W 2050/143; B60W 2540/229; B60W 2540/26; B60W 30/18072; B60W 40/08; B60W 50/14; B60W 50/16; B60W 60/0015; B60Y 2302/05; B60Y 2302/07; B60Y 2302/09; B60Y 2302/03
See application file for complete search history.

(56) References Cited

U.S. PATENT DOCUMENTS

| | | | |
|---|---|---|---|
| 2017/0364070 A1* | 12/2017 | Oba ................. | B60W 60/0059 |
| 2019/0099118 A1* | 4/2019 | Patel ...................... | A61B 5/746 |
| 2019/0184998 A1* | 6/2019 | Zheng ................. | B60W 60/007 |
| 2020/0247420 A1* | 8/2020 | Gunaratne ........... | G05D 1/0055 |

* cited by examiner

*Primary Examiner* — Jaime Figueroa
*Assistant Examiner* — Zachary Joseph Wallace
(74) *Attorney, Agent, or Firm* — Slater Matsil, LLP

(57) ABSTRACT

An embodiment method for controlling autonomous driving in a vehicle with an incorporated semi-autonomous driving system and warning alarm system includes monitoring a status of a driver during semi-autonomous driving, generating a state signal based on the monitoring, the state signal indicating a state that includes a warning state, a coasting state and a braking state, and performing a driver emergency assistance operation based on the state signal, wherein the vehicle transitions to the warning state, the coasting state, or the braking state based on the state signal to perform a corresponding driver emergency assistance operation.

20 Claims, 9 Drawing Sheets

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND THE LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND THE LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND THE LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE FOR EMERGENCY BY NECESSARILY RECEIVING RIGHT CONTROL WHEN LEVEL 3 SYSTEM REQUESTS CONTROL RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE FOR EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

FIG.1

| SOURCES OF USED INFORMATION | DEACTIVATION CONDITIONS |
|---|---|
| DRIVER STATE SENSING DEVICE & FORWARD VEHICLE SENSING DEVICE | WHEN DRIVER DROWSINESS STEP && DRIVER CARELESS STEP IS LESS THAN CERTAIN VALUE && WHEN THERE IS NO TARGET |
| PRESENT VEHICLE STATE SENSING DEVICE | WHEN EXTERNAL SITUATION IS NOT ABLE TO PERFORM SCC |
| PRESENT VEHICLE STATE SENSING DEVICE | WHEN DRIVER PRESSED ACCELERATOR OR BRAKE PEDAL |
| PRESENT VEHICLE STATE SENSING DEVICE & FORWARD VEHICLE SENSING DEVICE | WHEN AUXILIARY BRAKE IS OPERATED && WHEN THERE IS NO TARGET |
| PRESENT VEHICLE STATE SENSING DEVICE & FORWARD VEHICLE SENSING DEVICE | WHEN DRIVER OPERATES SWITCH && WHEN THERE IS NO TARGET |
| PRESENT VEHICLE STATE SENSING DEVICE | WHEN DRIVER MANIPULATED STEERING WHEEL |
| PRESENT VEHICLE STATE SENSING DEVICE | LFA INOPERABLE SITUATION (TO PREVENT UNEXPECTED SITUATIONS SUCH AS JACKKNIFE IN SITUATION IN WHICH LFA DOES NOT OPERATE WHEN BRAKING IS PERFORMED WITH DEA) |
| PRESENT VEHICLE STATE SENSING DEVICE | WHEN DRIVER MANIPULATED LEFT AND RIGHT TURN SIGNALS OR EMERGENCY WARNING LIGHT |

FIG.9

METHOD AND DEVICE FOR CONTROLLING AUTONOMOUS DRIVING

CROSS-REFERENCE TO RELATED APPLICATIONS

This application claims the benefit of Korean Patent Application No. 10-2020-0149541, filed in the Korean Intellectual Property Office on Nov. 10, 2020, which application is hereby incorporated herein by reference.

TECHNICAL FIELD

The present disclosure relates to autonomous vehicle control.

BACKGROUND

An autonomous vehicle is required to have an ability to adaptively cope with a surrounding situation that changes in real time during travel.

For mass production and invigoration of the autonomous vehicle, a reliable determination control function is required above all.

Semi-autonomous vehicles that have been recently released basically perform driving, braking, and steering on behalf of a driver to reduce fatigue of the driver.

In a case of semi-autonomous driving, unlike fully autonomous driving, the driver has to stay focused on driving such as continuously holding a steering wheel and the like.

Recently, the semi-autonomous vehicles are being sold with a highway driving assist (HDA) function, a driver status warning (DSW) function that determines driver carelessness and state abnormalities such as drowsy driving, distraction, and the like to output a warning alarm through a cluster and the like, a driver awareness warning (DAW) function that determines whether the vehicle crosses a line and travels unstably through a front camera and the like, a forward collision-avoidance assist (FCA) or an active emergency brake system (AEBS) function that performs sudden braking when detecting a forward collision, and the like.

In a case of autonomous driving shoulder stop, prior research is in progress, but a precise steering technology, a shoulder recognition sensor, a high-resolution map (HD MAP), and the like are required to apply a corresponding system, so that a manufacturing cost of the vehicle is increased.

In addition, when performing warning, braking, or system off by simply combining the HDA, the DSW, the FCA functions, and the like, a dangerous situation may rather be caused to the driver.

For example, when only the warning is provided or the system is turned off in a situation in which the driver is not able to react, an accident may be caused. On the other hand, in a situation in which the driver is able to react, excessive braking may impact a body of the driver who is not paying attention, or a cargo in a rear portion of the vehicle may push or impact a cabin.

Accordingly, there is a need for a driver emergency support system capable of minimizing a travel risk of the driver by adaptively responding based on a status of the driver even during the semi-autonomous driving.

SUMMARY

The present disclosure relates to autonomous vehicle control. Particular embodiments relate to an autonomous driving control technology capable of performing warning alarm output for each step and vehicle control utilizing coasting during semi-autonomous driving.

Embodiments of the present disclosure can solve problems occurring in the prior art while advantages achieved by the prior art are maintained intact.

An embodiment of the present disclosure provides a method and a device for controlling autonomous driving.

Another embodiment of the present disclosure provides a method and a device for controlling autonomous driving capable of minimizing a travel risk of a driver by adaptively responding based on a driver status during semi-autonomous driving.

Another embodiment of the present disclosure provides a method and a device for controlling autonomous driving capable of controlling systems in an integrated/fluid manner based on a situation by utilizing a coasting step without being limited to a simple combination of an existing mass-produced warning alarm system and an autonomous driving system.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, a method for controlling autonomous driving in a vehicle with an incorporated semi-autonomous driving system and warning alarm system includes monitoring a status of a driver during semi-autonomous driving, generating a state signal based on the monitoring result, and performing a driver emergency assistance operation based on the state signal, and the vehicle transitions to one of a warning state, a coasting state, and a braking state based on the state signal to perform the corresponding driver emergency assistance operation.

In one implementation, the coasting state may be a state capable of being activated after the warning state.

In one implementation, the braking state may be a state capable of being activated after the coasting state.

In one implementation, the coasting state may include a primary coasting state capable of being activated before the warning state and a secondary coasting state capable of being activated after the warning state, and the braking state may be a state capable of being activated after the secondary coasting state.

In one implementation, the method may further include collecting host vehicle state sensing information and forward vehicle sensing information, and generating a deactivation signal based on at least one of the host vehicle state sensing information, the forward vehicle sensing information, and/or the driver status monitoring information, and the vehicle may transition to a ready state in response to the deactivation signal.

In one implementation, the host vehicle state sensing information may include at least one of pedal override information, steering wheel override information, switch signal activation information, and/or system failure information.

In one implementation, the forward vehicle sensing information may include forward vehicle distance information, and the state signal may be generated further based on the forward vehicle distance information.

In one implementation, the driver status may include a drowsiness level, and a state transition may be performed based on at least one of the drowsiness level and a duration of each state.

In one implementation, the warning state may include a primary warning state activated when it is determined that driving is careless to output a visual warning alarm and a secondary warning state activated when it is determined that the driver is unconscious to output an audible and/or tactile warning alarm.

In one implementation, the method may further include stopping driving of the vehicle and activating the coasting state when a secondary warning state is maintained for a specific time, and activating the braking state when a system problem occurs in the secondary warning state.

In one implementation, the method may further include controlling the semi-autonomous driving to be performed again when the status of the driver returns to a normal state in the coasting state or in the braking state.

According to an embodiment of the present disclosure, a device for controlling autonomous driving includes a driver status sensing device that monitors a status of a driver during semi-autonomous driving, a host vehicle state sensing device that senses a state of a host vehicle, a forward vehicle sensing device that identifies a relevant forward vehicle to sense a distance from the corresponding forward vehicle, and an emergency determination device that generates a state signal or a deactivation signal based on information received from at least one of the driver status sensing device, the host vehicle state sensing device, and/or the forward vehicle sensing device, and the emergency determination device transitions to one of a warning state, a coasting state, and a braking state based on the state signal to control a driver emergency assistance operation corresponding to the corresponding state to be performed.

In one implementation, the coasting state may be a state capable of being activated after the warning state.

In one implementation, the braking state may be a state capable of being activated after the coasting state.

In one implementation, the coasting state may include a primary coasting state capable of being activated before the warning state and a secondary coasting state capable of being activated after the warning state, and the braking state may be a state capable of being activated after the secondary coasting state.

In one implementation, the emergency determination device may include a control deactivating device that generates the deactivation signal based on at least one of host vehicle state sensing information, forward vehicle distance information, and/or driver status monitoring information, and a control managing device that generates the state signal based on the forward vehicle distance information and the driver status monitoring information, and the vehicle may transition to a ready state in response to the deactivation signal.

In one implementation, the host vehicle state sensing information may include at least one of pedal override information, steering wheel override information, switch signal activation information, and/or system failure information.

In one implementation, the driver status may include a drowsiness level, and a state transition may be performed based on at least one of the drowsiness level and a duration of each state.

In one implementation, the warning state may include a primary warning state activated when it is determined that driving is careless to output a visual warning alarm and a secondary warning state activated when it is determined that the driver is unconscious to output an audible and/or tactile warning alarm, driving of the vehicle may be stopped and the coasting state may be activated when the secondary warning state is maintained for a specific time, and the braking state may be activated when a system problem occurs in the secondary warning state.

In one implementation, a control managing device may control the semi-autonomous driving to be performed again when the status of the driver returns to a normal state in the coasting state or in the braking state.

The technical problems to be solved by embodiments of the present inventive concept are not limited to the aforementioned problems, and any other technical problems not mentioned herein will be clearly understood from the following description by those skilled in the art to which the present disclosure pertains.

BRIEF DESCRIPTION OF THE DRAWINGS

The above and other objects, features and advantages of embodiments of the present disclosure will be more apparent from the following detailed description taken in conjunction with the accompanying drawings, in which:

FIG. 1 is a table in which automation levels of an autonomous vehicle are defined;

FIG. 9 is a diagram for illustrating deactivation signal generation conditions according to an embodiment of the present disclosure.

DETAILED DESCRIPTION OF ILLUSTRATIVE EMBODIMENTS

Figure 2:
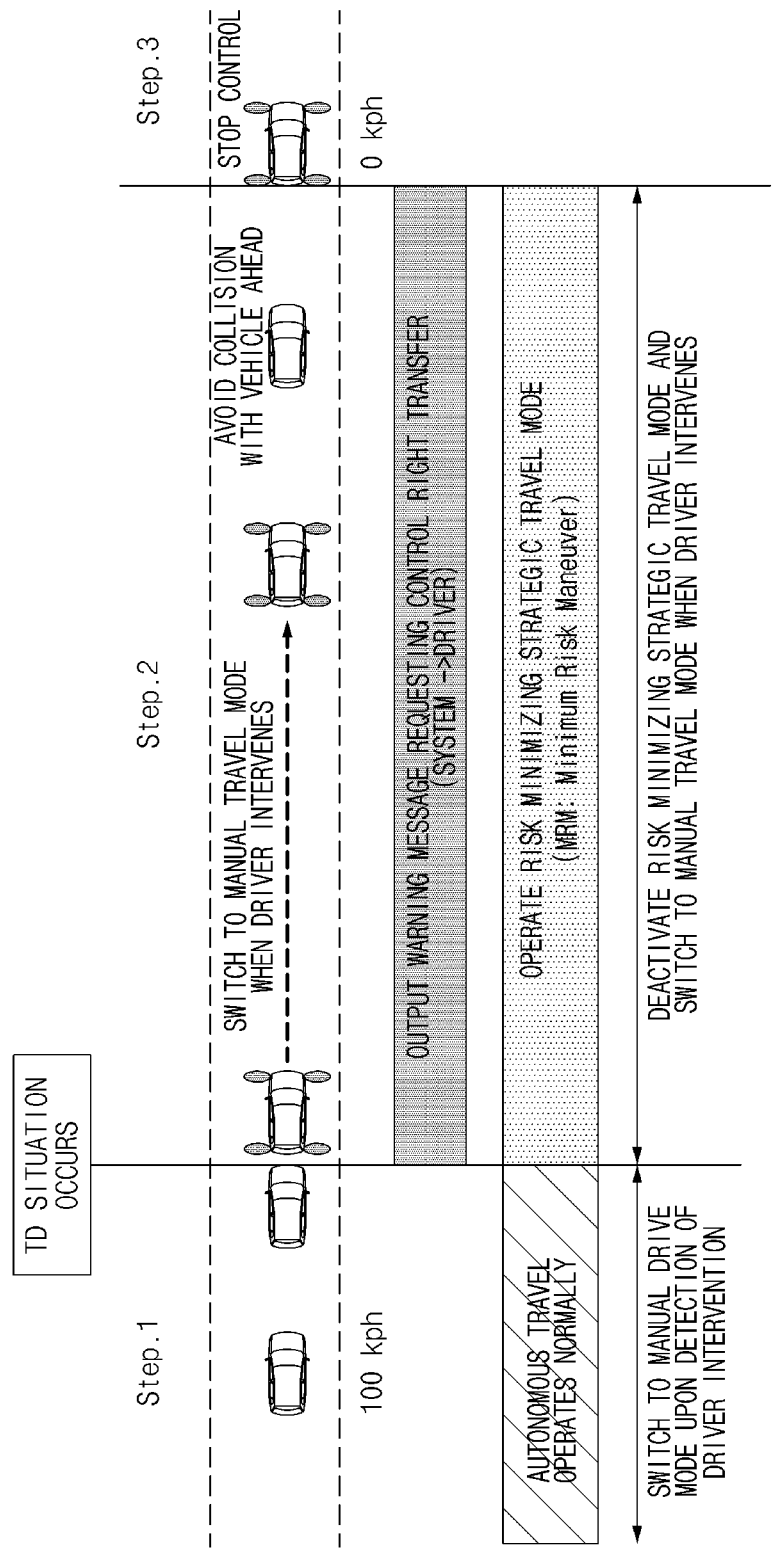
FIG. 2 is a diagram for illustrating an autonomous vehicle control procedure in response to an occurrence of a transition demand (TD) situation during autonomous driving.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 is a table in which automation levels of an autonomous vehicle are defined.

The autonomous vehicle refers to a vehicle that recognizes a travel environment by itself to determine a risk, minimizes travel manipulation of a driver while controlling a travel route, and drives by itself.

Ultimately, the autonomous vehicle refers to a vehicle capable of traveling, controlling, and parking without an influence of humans, and is focused on a vehicle in a state in which an autonomous driving technology, which is a core foundation of the autonomous driving autonomous vehicle, that is, an ability to operate the vehicle without active control or monitoring of the driver is the most advanced.

However, a concept of the autonomous vehicle currently being released may include an automation step of an intermediate step to the autonomous vehicle in a full sense, and corresponds to a goal-oriented concept on the premise of mass production and commercialization of a fully autonomous vehicle.

An autonomous driving control method according to embodiments of the present disclosure may be applied to an autonomous vehicle corresponding to a level 3 (conditional autonomous driving) among automation steps of the autonomous driving shown in FIG. 1. However, the present disclosure may not be necessarily limited thereto, and the autonomous driving control method may be applied to autonomous vehicles of any level that require control right transfer and vehicle control due to a system failure during autonomous driving.

The automation level of the autonomous vehicle based on the society of automotive engineers (SAE), which is an American association of automotive engineers, may be classified as shown in the table in FIG. 1.

FIG. 2 is a diagram for illustrating an autonomous vehicle control procedure in response to an occurrence of a transition demand (TD) situation during autonomous driving.

Hereinafter, for convenience of description, the autonomous vehicle will be simply described as being referred to as a "vehicle".

Referring to FIG. 2, when an autonomous driving function is activated in response to an autonomous driving selection button input and the like of the driver, the vehicle may perform autonomous driving control.

In an autonomous driving normal operation state, the vehicle may determine whether the driver has intervened in consideration of a steering wheel torque value, a steering wheel torque maintaining time, and the like.

The vehicle may switch to a manual travel mode when the driver intervention is sensed in the autonomous driving normal operation state.

When a transition demand (TD) situation occurs due to the system failure, collision risk sensing, and the like during the autonomous driving, the vehicle may activate a risk minimizing strategic travel mode after outputting a warning alarm message requesting control right transfer from the system to the driver.

In this connection, the TD situation refers to a situation in which it is difficult to maintain the autonomous driving any longer, which may include situations such as interruption of another vehicle, an appearance of a pedestrian or a wild animal in front, sensing of an obstacle in front, sudden stop of a forward vehicle, bad weather, and the like, but may not be limited thereto, and may include a system fault and failure situation such as a vehicle controller failure, a vehicle communication failure, a fuel shortage, and the like.

When activating the risk minimizing strategic travel mode, the vehicle may perform a lane maintenance deceleration control until stopping completely.

The vehicle may determine whether the driver has intervened in the risk minimizing strategic travel mode in consideration of a gaze direction of the driver, the steering wheel torque value, the steering wheel torque maintaining time, a control right transfer button input, and the like.

When sensing the driver intervention in the risk minimizing strategic travel mode, the vehicle may deactivate the risk minimizing strategic travel mode and switch to the manual travel mode.

When the control right transfer is normally completed in response to the driver intervention in the risk minimizing strategic travel mode, the vehicle may stop outputting the warning alarm message requesting the control right transfer from the system to the driver.

Figure 3:
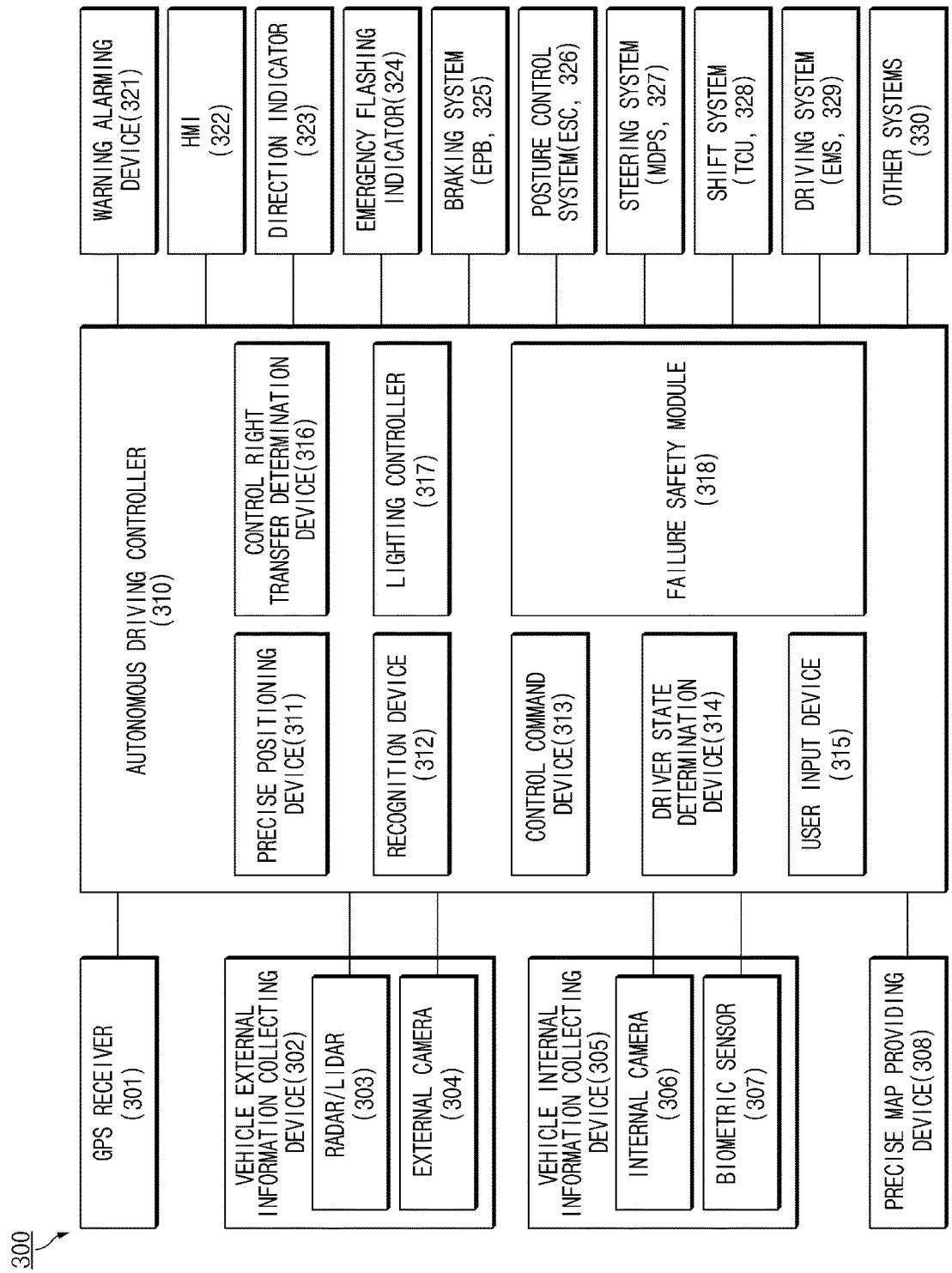
FIG. 3 is a block diagram for illustrating a structure of an autonomous driving control device according to an embodiment of the present disclosure.

FIG. 3 is a block diagram for illustrating a structure of an autonomous driving control device according to an embodiment of the present disclosure.

An autonomous driving control device according to FIG. 3 may be mounted on an autonomous vehicle of a level equal to or higher than a level 2.

For convenience of description below, an autonomous driving control device 300 will be described by being simply referred to as the device 300.

Referring to FIG. 3, the device 300 may include a global positioning system (GPS) receiver 301, a vehicle external information collecting device 302, a vehicle internal information collecting device 305, a precise map providing device 308, an autonomous driving controller 310, a warning alarming device 321, a human machine interface (HMI) 322, a direction indicator 323, an emergency flashing indicator 324, a braking system 325, a posture control system 326, a steering system 327, a shift system 328, a driving system 329, and other systems 330.

Systems in association with the autonomous driving controller 310 are respectively equipped with control devices to monitor whether the systems are failed, and transmit the monitoring results to a failure safety module 318 of the autonomous driving controller 310.

The GPS receiver 301 may receive a positioning signal from a positioning satellite. In this connection, the positioning signal may be used to generate geographic location information of the vehicle.

The vehicle external information collecting device 302 may collect vehicle surrounding environment information and travel state information. The vehicle external information collecting device 302 may include a radar/lidar 303 and an external camera 304.

The radar/lidar 303 may sense an object around the vehicle.

The radar/lidar 303 may sense objects in front of, to a side, and at the rear of the vehicle, and calculate distances to the sensed objects.

In addition, the radar/lidar 303 may distinguish whether the sensed object is a static object or a dynamic object, measure a moving speed of the sensed dynamic object, and distinguish whether the sensed dynamic object is a pedestrian or a vehicle.

In addition, the radar/lidar 303 may be used for purposes such as identifying a state of a travel road and a facility through a high-resolution terrain scan.

The external camera 304 may be mounted on an exterior of the vehicle to take images of regions in front of, to a side, and at the rear of the vehicle. To this end, the vehicle may be equipped with a plurality of external cameras.

The image taken by the external camera 304 may be used for line distinguishment, identification of the object around the vehicle, implementation of augmented reality, and the like.

The vehicle internal information collecting device 305 may collect various state information inside the vehicle.

The vehicle internal information collecting device 305 may include an internal camera 306 and a biometric sensor 307.

The internal camera 306 may be mounted on one side of an interior of the vehicle to photograph the driver and an occupant.

An image captured by the internal camera 306 may be used for monitoring a gaze direction of the driver and a status of the driver, for example, driver distraction, fatigue, drowsy driving, and the like.

The biometric sensor 307 may be mounted on one side of the vehicle to collect various biometric information of the driver.

The biometric sensor 307 may be in association with a wearable device of the driver to collect the various biometric information of the driver.

For example, the biometric information may include pulse information, heart rate monitoring information, body temperature information, blood alcohol concentration information, brainwave information, fingerprint recognition information, iris recognition information, and the like, but may not be limited thereto.

The biometric information may be used for determining a driving inability state, a drunk driving state, a drowsy driving state, and the like.

The precise map providing device 308 may provide precise map information in response to a request of the autonomous driving controller 310.

The autonomous driving controller 310 may include a precise positioning device 311, a recognition device 312, a control command device 313, a driver state determination device 314, a user input device 315, a control right transfer determination device 316, a lighting controller 317, and the failure safety module 318.

The precise positioning device 311 may determine a current location of a host vehicle using positioning signal information received from the GPS receiver 301 and the precise map information obtained from the precise map providing device 308, and map the determined current location of the host vehicle on a precise map.

In addition, the precise positioning device 311 may identify state information, for example, a gradient, a road type, the number of lines, a speed limit, and the like, of a travel road of the host vehicle.

The recognition device 312 may recognize a line around the vehicle, an obstacle around the vehicle, a pedestrian, and the like based on sensing information from the radar/lidar 303 and image information captured by the external camera 304.

The control command device 313 may calculate a request command value based on the recognition result of the recognition device 312, and transmit the calculated request command value to a corresponding autonomous driving system to perform travel control.

The driver state determination device 314 may determine the driver state based on the vehicle internal state information obtained from the vehicle internal information collecting device 305.

In this connection, the driver state may include a distracted state, a driving inability state, a drunk driving state, a drowsy driving state, a fatigued state, and the like, but may not be limited thereto.

The user input device 315 may sense a user input based on a control signal received from the HMI 322.

In this connection, the user input may include a predetermined button input signal, a predetermined gesture input signal, and the like for accepting control right transfer from the system to the driver.

The control right transfer determination device 316 may determine whether the control right transfer from the system to the driver is required based on at least one of various recognition information obtained from the recognition device 312, the vehicle internal state information obtained from the vehicle internal information collecting device 305, and/or driver input information obtained from the user input device 315.

When the control right transfer is required as a result of the determination, the control right transfer determination device 316 may transmit a predetermined control signal to the warning alarming device 321 to control a predetermined warning alarm message requesting the control right transfer to the driver to be output.

The lighting controller 317 may control lighting of the direction indicator 323 and the emergency flashing indicator 324.

The failure safety module 318 may determine an optimal failure safety strategy based on a type of a failure sensed during the autonomous driving and a travel situation around the vehicle.

The failure safety module 318 may request the control command device 313 to perform vehicle control based on the determined failure safety strategy.

A detailed configuration and a detailed operation of the failure safety module 318 will become clearer through description of a drawing to be described later.

The braking system 325 may control an operation of an actuator related to the braking and monitor a state of the actuator.

As an example, the braking system 325 may include an electronic parking brake (EPB) that creates a braking force in an electronic manner rather than a physical force of a person.

The posture control system 326 may control an operation of an actuator for stably maintaining a posture of a vehicle body.

As an example, the posture control system 326 may include an electronic stability control (ESC), which is an advanced electronic braking device.

The ESC is a device that controls the posture of the vehicle through cooperative control of the braking force and a driving force of the vehicle. The ESC may provide anti-lock brake system (ABS) and traceability control system (TCS) functions together.

The electronic stability control (ESC) may determine whether the posture of the vehicle body is stably maintained by combining information measured by steering angle, lateral acceleration, yaw-rate, and wheel speed sensors, and may operate in a scheme of controlling braking forces of four wheels independently based on such information.

The steering system 327 may control an operation of an actuator that controls a lateral behavior of the vehicle.

For example, the steering system 327 may include a motor driven power steering (MDPS). The MDPS is a device that assists driver handling using an electronic motor, not an oil pressure, which may include a dual power input structure and multiple signal channels for stable power supply and signal transmission/reception.

The shift system 328 may control an operation of an actuator for automatic shift.

As an example, the shift system 328 may include an automatic transmission control unit (TCU).

The transmission control unit (TCU) may determine a shift stage number and a timing based on a TPS, the vehicle speed, the number of engine rotations, a brake switch input, and the like to control an automatic transmission.

The driving system 329 may control an operation of an actuator that controls the longitudinal behavior, that is, the travel speed of the vehicle. For example, the actuator for controlling the longitudinal behavior may include a throttle, an accelerator, and the like.

For example, the driving system 329 may include an engine management system (EMS).

The EMS may perform electronic throttle control, gasoline direct injection, idle stop and go functions.

The other systems 330 may include a tire pressure measurement system for measuring a tire air pressure such as a tire pressure monitoring system (TPMS), a fuel tank sensing system, a battery management system disposed in a hybrid vehicle and an electric vehicle, and the like, but may not be limited thereto.

Figure 4:
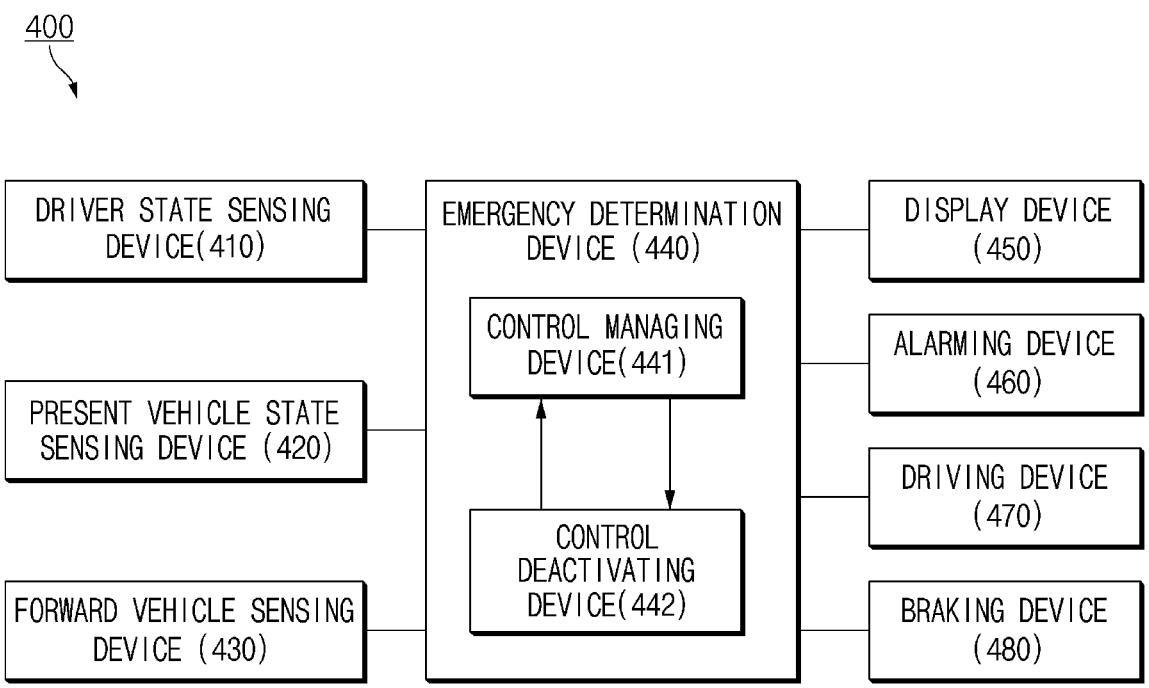
FIG. 4 is a block diagram for illustrating a structure of an autonomous driving control device according to another embodiment of the present disclosure.

FIG. 4 is a block diagram of an autonomous driving control device according to another embodiment of the present disclosure.

Referring to FIG. 4, an autonomous driving control device 400 may include a driver state sensing device 410, a present or host vehicle state sensing device 420, a forward vehicle sensing device 430, an emergency determination device 440, a display device 450, an alarming device 460, a driving device 470, and a braking device 480.

In the present embodiment, the autonomous driving control device 400 may further include at least one of the components of the autonomous driving control device 300 according to FIG. 3 described above.

The emergency determination device 440 may include a control managing device 441 and a control deactivating device 442.

The emergency determination device 440 may determine a control step by receiving various event signals from the driver state sensing device 410, the present vehicle state sensing device 420, and the forward vehicle sensing device 430, and adaptively control operations of the display device 450, the alarming device 460, the driving device 470, and the braking device 480 based on the determined control step.

The driver state sensing device 410 may generate a driver state warning event by monitoring the state of the driver, or may generate a driver state warning release event for deactivating a previously generated driver state warning event. For example, the driver state warning event may be generated in response to sensing of the driver state such as a drowsy driving state, a gaze deviated state, a careless state, an unconscious state, and the like.

The present vehicle state sensing device 420 may monitor a driver vehicle manipulation state and a system error, and may generate a predetermined host vehicle state event based on the monitoring result. For example, the host vehicle state event may include a pedal override event, a steering wheel override event, a switch signal active event, a system failure event, and the like, but may not be limited thereto.

The forward vehicle sensing device 430 may generate a predetermined forward vehicle event by monitoring the forward vehicle. As an example, the forward vehicle sensing device 430 may determine whether the forward vehicle is a relevant vehicle based on a distance from the forward vehicle and the host vehicle state monitoring result. When the forward vehicle is the relevant vehicle as the result of the determination, the forward vehicle sensing device 430 may generate a forward vehicle distance event.

The control managing device 441 may determine control steps such as a first warning step, a second warning step, a coasting step, a braking step, and the like, and may control the operations of the display device 450, the alarming device 460, the driving device 470, and the braking device 480 by outputting a predetermined state signal based on the determination result. In addition, the control managing device 441 may transmit a state signal corresponding to a currently active control step to the control deactivating device 442.

The control managing device 441 may control a state transition based on the control step determination. In this connection, states of the control managing device 441 may include a ready state, a warning state, a coasting state, and a braking state.

In an embodiment, the warning state may include a primary warning state of outputting a visual warning alarm and a secondary warning state of outputting an audible warning alarm when the primary warning state is maintained for a specific time or longer. As an example, the primary warning state may be activated when it is determined that the driver performs careless driving, and the secondary warning state may be activated when it is determined that the driver is in an unconscious state such as being drowsy and the like.

When the driver performs the careless driving or is in the unconscious state for a specific time or longer, the control managing device 441 may stop the driving of the semi-autonomous driving and activate the coasting state to control the vehicle speed to gradually decelerate.

When the driver performs the careless driving or is in the unconscious state for the specific time or longer in the coasting state or when a system problem such as inability to engage automatic steering control occurs, the control managing device 441 may activate the braking state to perform automatic braking.

When a downhill road is sensed or the forward vehicle is sensed in the coasting state, the control managing device 441 may activate the braking state and perform the automatic braking.

When identifying in the coasting state that the driver is concentrating or is conscious again, the control managing device 441 may control the semi-autonomous driving to be continuously performed.

In an embodiment, the coasting state may include a primary coasting state that is activated based on the change in the driver state from the ready state, and a secondary coasting state that is activated when the secondary warning state is maintained for a specific time.

The control managing device 441 may receive a control deactivation signal from the control deactivating device 442.

In this case, the control managing device 441 may deactivate the currently active control step in response to the control deactivation signal. When the control step is deactivated, the control managing device 441 may activate the ready step.

The control deactivating device 442 may generate the control deactivation signal based on the state signal received from the control managing device 441, various event information related to manual manipulation of the driver received from the present vehicle state sensing device 420, forward vehicle distance event information received from the forward vehicle sensing device 430, driver state warning release event information received from the driver state sensing device 410, and the like.

Specific examples in which the control deactivation signal is generated will be described in detail in FIG. 9 to be described later.

The control managing device 441 may immediately switch to the ready step when the control deactivation signal is received from the control deactivating device 442 regardless of the currently active control step.

Figure 5:
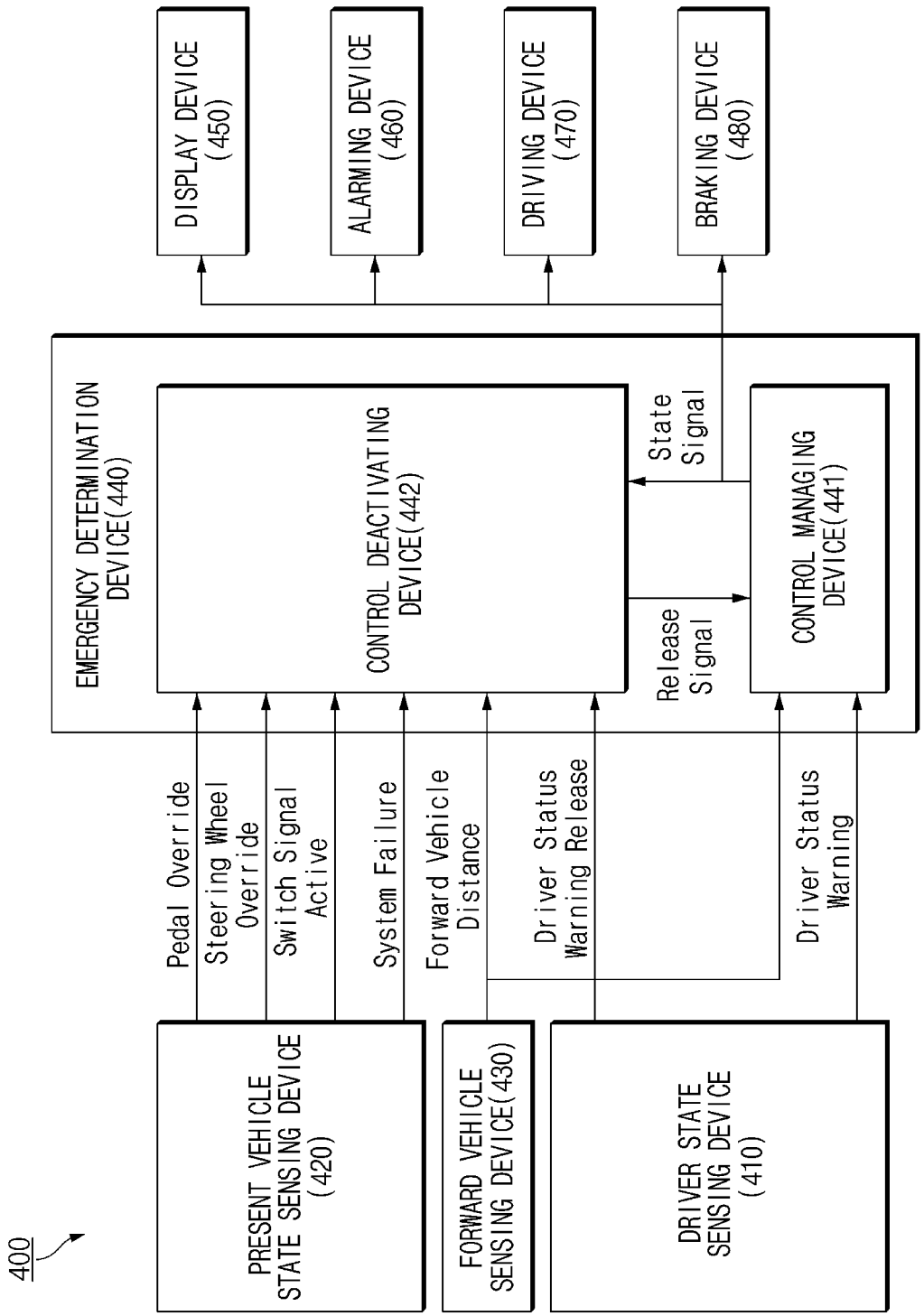
FIG. 5 is a diagram for illustrating a signal flow in an autonomous driving control device according to an embodiment of the present disclosure.

FIG. 5 is a diagram for illustrating a signal flow in an autonomous driving control device according to an embodiment of the present disclosure.

Referring to FIG. 5, the control deactivating device 442 may receive a pedal override event signal informing a pedal manipulation status of the driver, a steering wheel override event signal informing a steering wheel grip and/or manipulation status of the driver, a switch signal active event signal informing a switch manipulation status of the driver, a system failure event signal informing a system failure state, and the like from the present vehicle state sensing device 420.

The forward vehicle sensing device 430 may transmit a forward vehicle distance event signal to the control deactivating device 442 and the control managing device 441.

The driver state sensing device 410 may transmit a driver status warning event signal to the control managing device 441.

The driver state sensing device 410 may transmit a driver status warning release event signal to the control deactivating device 442.

The control managing device 441 may determine the control step based on at least the forward vehicle distance event signal and the driver status warning event signal, and dynamically generate a state signal corresponding to the determined control step.

The control deactivating device 442 may determine whether to deactivate the currently active control step based on the event signal received from the present vehicle state sensing device 420, the forward vehicle sensing device 430, and the driver state sensing device 410. When the control deactivation is required, the control deactivating device 442 may transmit a deactivation signal to the control managing device 441.

The control managing device 441 may immediately switch to the ready step, or the ready state, regardless of the current control step, or control state, in response to the deactivation signal.

When activating the ready step, all previously activated control steps may be deactivated.

Figure 6:
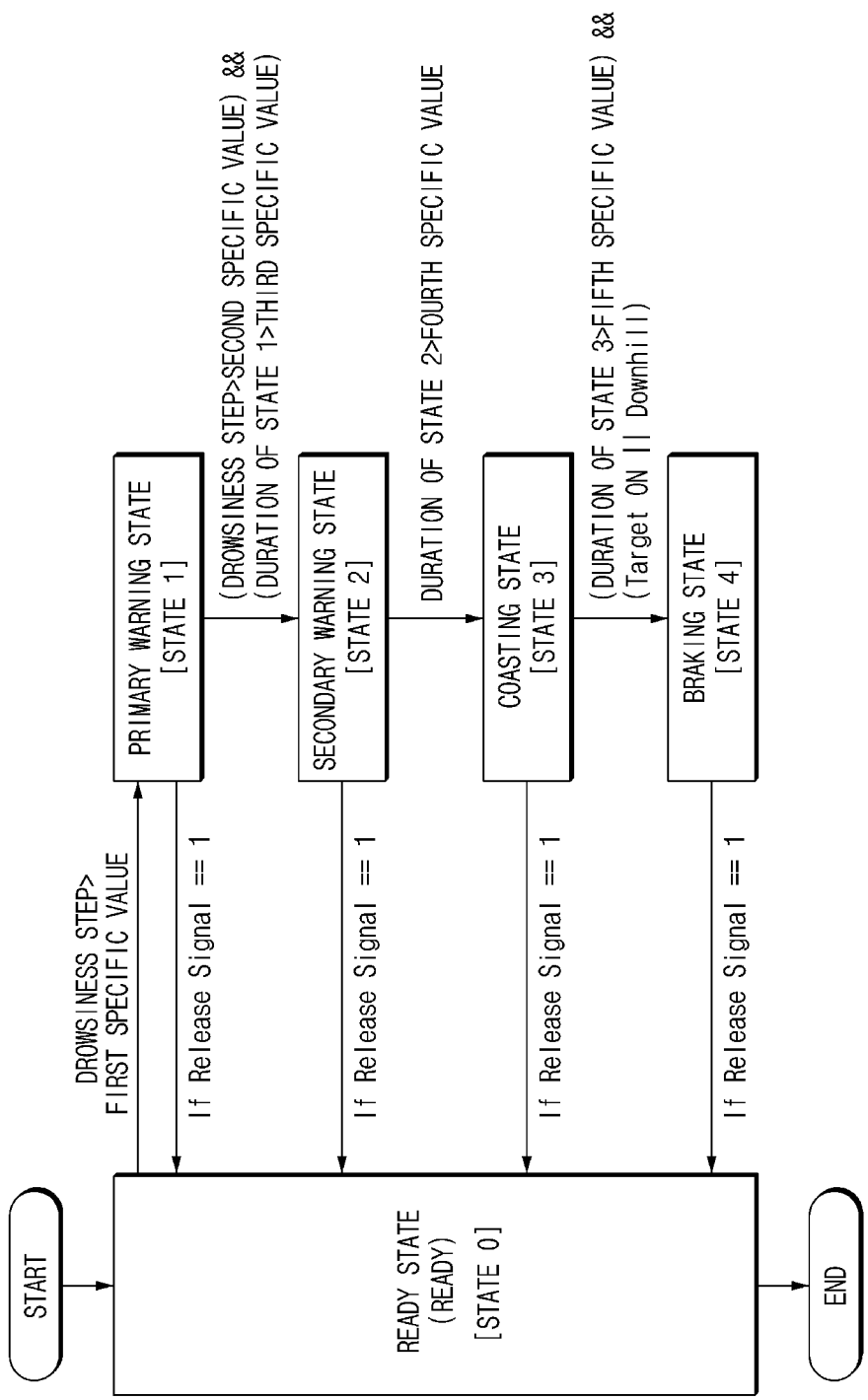
FIG. 6 is a state transition diagram for illustrating an operation mechanism of an autonomous driving control device according to an embodiment of the present disclosure.

FIG. 6 is a state transition diagram for illustrating an operation mechanism of an autonomous driving control device according to an embodiment of the present disclosure.

Specifically, FIG. 6 is a state transition diagram for driver emergency assist (DEA) operation control during the semi-autonomous driving.

Referring to FIG. 6, the states of the control managing device 441 of the autonomous driving control device may include the ready state (a STATE 0), the primary warning state (a STATE 1), the secondary warning state (a STATE 2), the coasting state (a STATE 3), and the braking state (a STATE 4).

When a drowsiness step, or a drowsiness level, exceeds a first specific value in the ready state, the control managing device 441 may transition to the primary warning state. As an example, in the primary warning state, the visual warning alarm may be output through a cluster and the like.

When the drowsiness step exceeds a second specific value and a duration of the STATE 1 exceeds a third specific value in the primary warning state, the control managing device 441 may transition to the secondary warning state. As an example, the audible and/or the tactile alarm may be output in the secondary warning state.

When a duration of the STATE 2 exceeds a fourth specific value in the secondary warning state, the control managing device 441 may transition to the coasting state.

When a duration of the STATE 3 exceeds a fifth specific value in the coasting state, and in a target on state in which the forward vehicle is sensed or in a downhill state of traveling on the downhill road, the control managing device 441 may transition to the braking state.

As an embodiment, when the downhill road ahead is sensed in the primary warning state or in the secondary warning state, the control managing device 441 may control such that the automatic braking is performed by activating the braking state immediately without performing the coasting even when the forward vehicle does not exist.

As an embodiment, when the distance from the forward vehicle becomes equal to or less than the reference value in the coasting state, the control managing device 441 may terminate the coasting state and activate the braking state. When the distance from the forward vehicle becomes equal to or greater than the reference value again in the braking state, the control managing device 441 may re-activate the coasting state from the braking state.

When the deactivation signal is received in the STATEs 1 to 4, the control managing device 441 may transition to the ready state.

In the above embodiment, specific values for determining the transition between the states may be set and adjusted as parameter values.

As shown in FIG. 6, the control managing device 441 according to the present embodiment may activate the coasting state immediately without transitioning to the braking state after providing the warning alarm when sensing an emergency, for example, drowsy driving, driver carelessness, and the like, thereby improving a travel feeling of the driver. When activating the braking state, a brake is automatically driven, so that the driver may immediately recognize the braking. However, in the coasting state, the deceleration is performed only with a grip force of a tire without the brake driving, so that the driver is not able to immediately recognize the braking. Embodiments of the present disclosure utilize the coasting for speed maintenance and gentle deceleration when a situation such as a basic forward collision-avoidance assist (FCA) and the like occurs, so that travel satisfaction of the driver may be improved.

In addition, embodiments of the present disclosure may not only improve fuel efficiency by blocking unnecessary braking, but may also reduce wear of the tire, the brakes, and the like.

Figure 7:
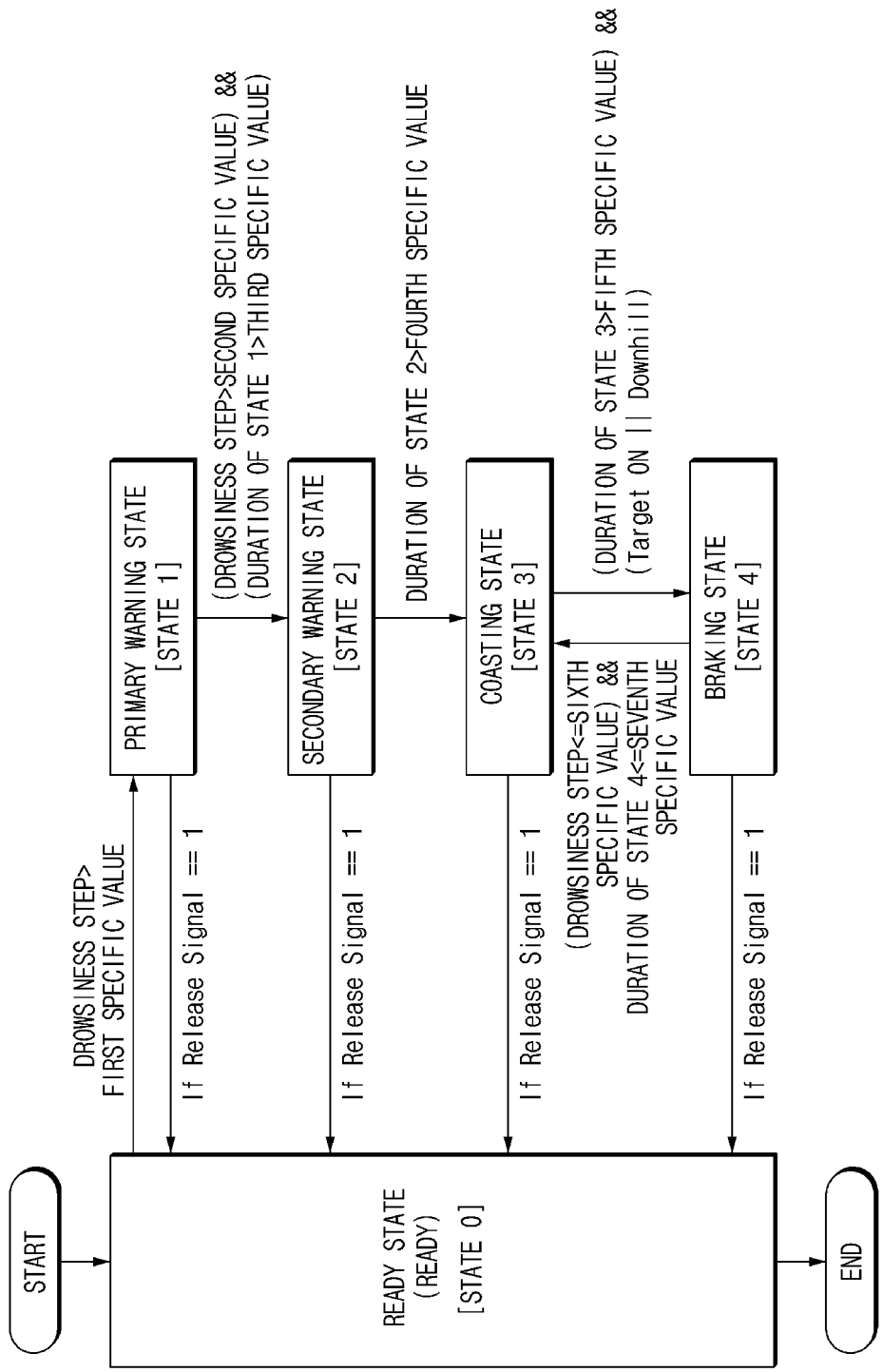
FIG. 7 is a state transition diagram for illustrating an operation mechanism of an autonomous driving control device according to another embodiment of the present disclosure.

FIG. 7 is a state transition diagram for illustrating an operation mechanism of an autonomous driving control device according to another embodiment of the present disclosure.

In the situation of performing the braking or the coasting, the control managing device 441 according to an embodiment may maintain the semi-autonomous driving by performing a SCC basic function again without turning off a semi-autonomous driving system based on the status of the driver.

Referring to FIG. 7, when the drowsiness step (or the drowsiness level) falls to be equal to or less than a sixth specific value in the braking state, and when a duration of the STATE 4 is equal to or less than a seventh specific value, the control managing device 441 may activate the coasting state.

That is, the control managing device 441 may control the semi-autonomous driving to be performed again when the driver concentrates again in the coasting state or braking state. Through the control, the control managing device 441 may reduce the number of unnecessary manipulations of the driver for re-driving the semi-autonomous driving system.

Figure 8:
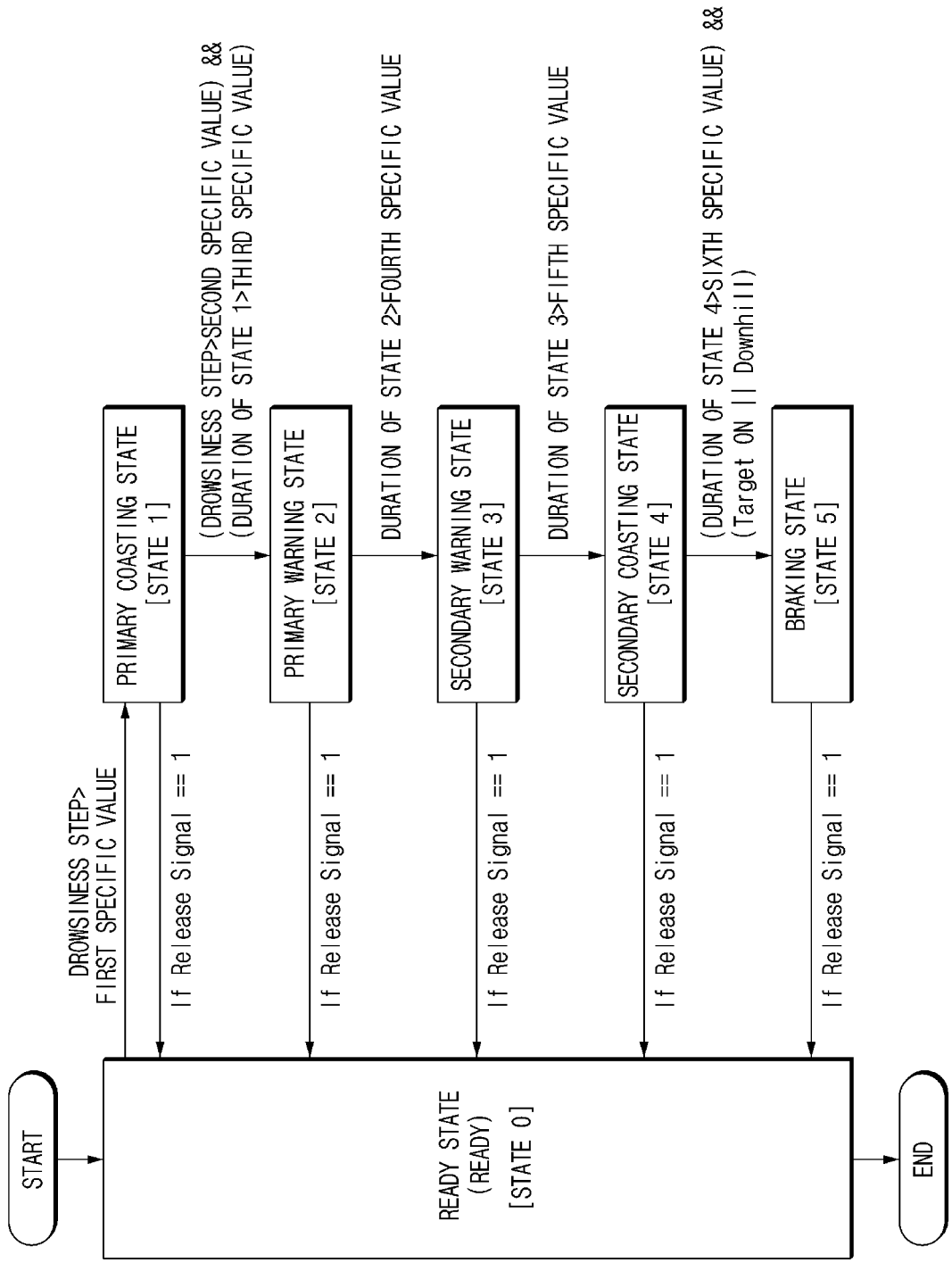
FIG. 8 is a state transition diagram for illustrating an operation mechanism of an autonomous driving control device according to another embodiment of the present disclosure.

FIG. 8 is a state transition diagram for illustrating an operation mechanism of an autonomous driving control device according to another embodiment of the present disclosure.

Referring to FIG. 8, the states of the control managing device 441 of the autonomous driving control device may include the ready state (a STATE 0), the primary coasting state (a STATE 1), the primary warning state (a STATE 2), the secondary warning state (a STATE 3), the secondary coasting state (a STATE 4), and the braking state (a STATE 5).

When the drowsiness step exceeds the first specific value in the ready state, the control managing device 441 may transition to the primary coasting state.

That is, when the driver carelessness is identified, the control managing device 441 may control the coasting to be performed before outputting the audio-visual warning, thereby controlling the vehicle to automatically lower a travel risk without applying a cognitive load of the driver.

When the drowsiness step exceeds the second specific value in the primary coasting state, and when a duration of the STATE 1 exceeds the third specific value, the control managing device 441 may transition to the primary warning state and control output of a predetermined audio-visual warning alarm to be started.

When a duration of the STATE 2 exceeds the fourth specific value in the primary warning state, the control managing device 441 may transition to the secondary warning state and control the predetermined audio-visual warning alarm to be output.

When a duration of the STATE 3 exceeds the fifth specific value in the secondary warning state, the control managing device 441 may transition to the secondary coasting state.

When a duration of the STATE 4 exceeds the sixth specific value in the secondary coasting state, and in the target on state in which the forward vehicle is sensed or in the downhill state of traveling on the downhill road, the control managing device 441 may transition to the braking state.

As an embodiment, when the downhill road ahead is sensed in the primary warning state or in the secondary warning state, the control managing device 441 may control such that the automatic braking is performed by activating the braking state immediately without performing secondary coasting even when the forward vehicle does not exist.

As an embodiment, when the distance from the forward vehicle becomes equal to or less than the reference value in the secondary coasting state, the control managing device 441 may terminate the secondary coasting state and activate the braking state. When the distance from the forward vehicle becomes equal to or greater than the reference value again in the braking state, the control managing device 441 may re-activate the secondary coasting state from the braking state.

When the deactivation signal is received in the STATEs 1 to 5, the control managing device 441 may transition to the ready state.

The specific values for determining the transition between the states may be set and adjusted as the parameter values.

As shown in FIG. 8, the state transition diagram according to the present embodiment may be configured to include the plurality of coasting states. In particular, as primary coasting is performed before the audio-visual warning output resulted from the identification of the driver carelessness, there is an advantage that the vehicle may automatically lower the travel risk by sufficiently securing the distance, that is, a headway distance, from the forward vehicle while minimizing the cognitive load of the driver.

FIG. 9 is a diagram for illustrating deactivation signal generation conditions according to an embodiment of the present disclosure.

Referring to FIGS. 4, 5, and 9, the control deactivating device 442 may determine whether predetermined deactivation conditions are satisfied based on the information (or the event signal) collected from at least one of the driver state sensing device 410, the present vehicle state sensing device 420, and/or the forward vehicle sensing device 430, and may generate the deactivation signal when the deactivation conditions are satisfied as the result of the determination.

As an example, when sensing a situation in which the external situation is not able to perform smart cruise control (SCC), a situation in which the driver pressed an accelerator or brake pedal, a situation in which there is no target, that is, the forward vehicle, when an auxiliary brake is operated, a situation in which there is no target when the driver operates a switch, a situation in which steering wheel manipulation of the driver is sensed, a situation in which lane following assist (LFA) and/or lane keeping assist (LKA) operations are not possible, a situation in which the driver manipulated left and right turn signals or an emergency warning light, and the like, the control deactivating device 442 may generate the deactivation signal based on the various event signals received from the present vehicle state sensing device 420 and the forward vehicle sensing device 430.

As another example, when the driver drowsiness step and/or a driver careless step is less than a certain value and there is no target, the control deactivating device 442 may generate the deactivation signal based on the information (or the event signal) received from the driver state sensing device 410 and the forward vehicle sensing device 430.

As described above, the autonomous driving control device according to embodiments of the present disclosure adaptively controls the coasting and the braking based on the driver status in addition to the simple warning alarm, thereby performing active control not only in normal travel but also in a semi-autonomous driving section.

In addition, the autonomous driving control device according to embodiments of the present disclosure is able to perform the vehicle control more fluidly by applying the control step called the coasting as well as the primary and secondary audio-visual alarm warning and the automatic braking, thereby not only lowering the travel risk, but also contributing to the improvement of the driver travel satisfaction, fuel economy reduction, the brake and tire wear prevention, and the like.

In addition, the autonomous driving control device according to embodiments of the present disclosure controls a system that monitors the driver status to output the simple warning alarm and the semi-autonomous driving system in an integrated manner, thereby implementing a response strategy consistent in terms of the driver and the vehicle.

The operations of the method or the algorithm described in connection with the embodiments disclosed herein may be embodied directly in hardware or a software module executed by the processor, or in a combination thereof. The software module may reside on a storage medium (that is, the memory and/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

Embodiments of the present disclosure have an advantage of providing the method and the device for controlling the autonomous driving for the semi-autonomous vehicles.

In addition, embodiments of the present disclosure have an advantage of providing the method and the device for controlling the autonomous driving capable of minimizing the travel risk of the driver by controlling the alarm and the vehicle stepwise/adaptively based on the driver status during the semi-autonomous driving.

In addition, embodiments of the present disclosure have an advantage of providing the method and the device for controlling the autonomous driving capable of controlling the system in the integrated/fluid manner based on the situation by utilizing the coasting step without being limited to the simple combination of the existing mass-produced warning alarm system and the autonomous driving system.

In addition, embodiments of the present disclosure have an advantage of improving the travel satisfaction of the driver through fluid use of the coasting, and minimizing an increase in fuel use and the wear of the tire/the brake resulted from the unnecessary braking.

In addition, embodiments of the present disclosure may be expected to reduce the travel risk of the driver by outputting the warning for each step based on the driver status or directly controlling the vehicle.

In addition, embodiments of the present disclosure have an advantage of implementing the response strategy consistent in terms of the driver and the vehicle by integrating the system that monitors the driver status to output the simple warning alarm and the semi-autonomous driving system.

In addition, embodiments of the present disclosure have an advantage of effectively preventing an occurrence of an additional risk situation resulted from rapid vehicle control from a driver's point of view by adding the coasting step in a control strategy.

In addition, various effects that are directly or indirectly identified through the present document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling autonomous driving of a vehicle with an incorporated semi-autonomous driving system and warning alarm system, the method comprising:
   monitoring a status of a driver during semi-autonomous driving;
   generating a state signal based on the monitoring, the state signal indicating a state that includes a warning state, a coasting state and a braking state; and
   performing a driver emergency assistance operation based on the state signal, wherein the vehicle transitions to the warning state, the coasting state, or the braking state based on the state signal to perform a corresponding driver emergency assistance operation,
   wherein the status of the driver includes a drowsiness level,
   wherein the coasting state includes a primary coasting state capable of being activated before the warning state and a secondary coasting state capable of being activated after the warning state, and
   wherein performing the driver emergency assistance operation based on the state signal includes:
   stopping driving of the semi-autonomous driving and activating the primary coasting state when the driver performs careless driving or is drowsy,
   activating the braking state to perform automatic braking in a first implementation when a system problem occurs in the secondary coasting state, and
   activating the driving of the semi-autonomous driving in a second implementation when the status of the driver returns to a normal state again while in the secondary coasting state.

2. The method of claim 1, wherein the coasting state is a state capable of being activated after the warning state.

3. The method of claim 2, wherein the braking state is a state capable of being activated after the coasting state.

4. The method of claim 1, wherein:
   the braking state is a state capable of being activated after the secondary coasting state.

5. The method of claim 1, further comprising:
   collecting host vehicle state sensing information and forward vehicle sensing information; and
   generating a deactivation signal based on the host vehicle state sensing information, the forward vehicle sensing information, or the status of the driver,
   wherein the vehicle transitions to a ready state in response to the deactivation signal.

6. The method of claim 5, wherein the host vehicle state sensing information includes pedal override information, steering wheel override information, switch signal activation information, or system failure information.

7. The method of claim 5, wherein:
the forward vehicle sensing information includes forward vehicle distance information; and
the state signal is generated further based on the forward vehicle distance information.

8. The method of claim 1, wherein a state transition is performed based on at least one of the drowsiness level and a duration of each state.

9. The method of claim 1, wherein the warning state includes a primary warning state activated to output a visual warning alarm when it is determined that driving is careless and a secondary warning state activated to output an audible or tactile warning alarm when it is determined that the driver is drowsy.

10. The method of claim 9, further comprising:
stopping driving of the vehicle and activating the coasting state when the secondary warning state is maintained for a specific time; and
activating the braking state when the system problem occurs in the secondary warning state.

11. The method of claim 1, further comprising activating the braking state when a downhill road is sensed in the coasting state.

12. The method of claim 11, further comprising controlling the semi-autonomous driving to be performed again when the status of the driver returns to the normal state in the braking state.

13. A device for controlling autonomous driving, the device comprising:
a driver status sensing device configured to monitor a status of a driver during semi-autonomous driving;
a host vehicle state sensing device configured to sense a state of a host vehicle;
a forward vehicle sensing device configured to identify a relevant forward vehicle to sense a distance from the host vehicle to the relevant forward vehicle; and
an emergency determination device configured to generate a state signal or a deactivation signal based on information received from the driver status sensing device, the host vehicle state sensing device, or the forward vehicle sensing device,
wherein the state signal indicates a state that includes a warning state, a coasting state and a braking state,
wherein the status of the driver includes a drowsiness level,
wherein the coasting state includes a primary coasting state capable of being activated before the warning state and a secondary coasting state capable of being activated after the warning state, and
wherein the emergency determination device is further configured to:
transition to the warning state, the coasting state, or the braking state based on the state signal to control a driver emergency assistance operation corresponding to the state indicated by the state signal by:
stopping driving of the semi-autonomous driving and activating the primary coasting state when the driver performs careless driving or is drowsy,
activating the braking state to perform automatic braking in a first implementation when a system problem occurs in the secondary coasting state, and
activating the driving of the semi-autonomous driving in a second implementation when the status of the driver returns to a normal state again while in the secondary coasting state.

14. The device of claim 13, wherein the coasting state is a state capable of being activated after the warning state.

15. The device of claim 14, wherein the braking state is a state capable of being activated after the coasting state.

16. The device of claim 13, wherein:
the braking state is a state capable of being activated after the secondary coasting state.

17. The device of claim 13, wherein the emergency determination device includes:
a control deactivating device configured to generate the deactivation signal based on host vehicle state sensing information, forward vehicle distance information, or driver status monitoring information; and
a control managing device configured to generate the state signal based on the forward vehicle distance information and the driver status monitoring information,
wherein the host vehicle is configured to transition to a ready state in response to the deactivation signal.

18. The device of claim 17, wherein the host vehicle state sensing information includes pedal override information, steering wheel override information, switch signal activation information, or system failure information.

19. The device of claim 13, wherein a state transition is performed based on at least one of the drowsiness level and a duration of each state.

20. The device of claim 13, wherein:
the warning state includes a primary warning state configured to be activated to output a visual warning alarm when it is determined that driving is careless and a secondary warning state configured to be activated to output an audible and/or tactile warning alarm when it is determined that the driver is drowsy;
when the secondary warning state is maintained for a specific time, the host vehicle is configured to be stopped and the coasting state is configured to be activated; and
the braking state is configured to be activated when the system problem occurs in the secondary warning state.

* * * * *